United States Patent [19]

Meyer

[11] Patent Number: 4,601,542
[45] Date of Patent: Jul. 22, 1986

[54] NEMATIC LIQUID CRYSTAL STORAGE DISPLAY DEVICE

[75] Inventor: Robert B. Meyer, Wellesley, Mass.

[73] Assignee: AT&T Bell Laboratories, Murray Hill, N.J.

[21] Appl. No.: 788,107

[22] Filed: Oct. 17, 1985

Related U.S. Application Data

[63] Continuation of Ser. No. 434,618, Oct. 15, 1982, abandoned.

[51] Int. Cl.$^4$ ................................................ G02F 1/13
[52] U.S. Cl. ................................ 350/334; 350/331 R; 350/341
[58] Field of Search ................ 350/330, 331 R, 334, 350/341, 346

[56] References Cited

U.S. PATENT DOCUMENTS

| | | | |
|---|---|---|---|
| 4,333,708 | 6/1982 | Boyd et al. | 350/334 X |
| 4,400,060 | 8/1983 | Cheng | 350/341 X |

OTHER PUBLICATIONS

DeGennes, P. G., *The Physics of Liquid Crystals,* (Clarendon Press, Oxford), pp. 188–191.
J. Appl. Phys. 52(4), Apr. 1981, "Boundary-Layer Model of Field Effects in a Bistable Liquid-Crystal Geometry", by Julian Cheng and R. N. Thurston, pp. 2756–2765.
J. Appl. Phys. 53(6), Jun. 1982, "Optical Properties of a New Bistable Twisted Nematic Liquid Crystal Boundary Layer Display", by R. N. Thurston, Julian Cheng, and G. D. Boyd, pp. 4463–4479.
Appl. Phys. Lett. 40(12), Jun. 15, 1982, "A Nematic Liquid Crystal Storage Display Based On Bistable Boundary Layer Configurations", by J. Cheng, R. N. Thurston and G. D. Boyd, pp. 1007–1009.

*Primary Examiner*—John K. Corbin
*Assistant Examiner*—Richard F. Gallivan
*Attorney, Agent, or Firm*—P. A. Businger

[57] ABSTRACT

A bistable nematic liquid crystal display cell is electrically switched between topologically equivalent, asymmetric horizontal states. Switching is initiated by application of a symmetry breaking field such as a DC electric field of a predetermined polarity. An AC electric potential is then applied across the cell to complete the switching cycle and maintain the state. The cell includes upper and lower parallel substrates, upper and lower topographically textured tilt alignment surfaces on the corresponding substrates, and nematic liquid crystal material between the substrates. In an active region of the cell, the tilt alignment surfaces form an equal reverse tilt boundary condition. In an isolation region surrounding the active region of the cell, the tilt alignment surfaces are formed to have a parallel tilt boundary condition.

4 Claims, 7 Drawing Figures

NEMATIC LIQUID CRYSTAL STORAGE DISPLAY DEVICE

This application is a continuation of application Ser. No. 434,618 filed Oct. 15, 1982, abandoned.

CROSS-REFERENCE TO RELATED APPLICATIONS

U.S. patent application entitled "A Nematic Liquid Crystal Storage Display Device", Ser. No. 434,524, now abandoned was filed in the U.S. Patent and Trademark Office concurrently herewith, and U.S. patent application Ser. No. 788,108 was filed on Oct. 17, 1985 as a continuation application.

Also, U.S. patent application entitled "A Nematic Liquid Crystal Storage Display Device", Ser. No. 434,522, now abandoned, was filed in the U.S. Patent and Trademark Office concurrently herewith, and U.S. patent application Ser. No. 788,673 was filed on Oct. 17, 1985 as a continuation application.

TECHNICAL FIELD

This invention relates to display devices and, more particularly, to bistable liquid crystal devices.

BACKGROUND OF THE INVENTION

Bistable nematic liquid crystal display devices generally require large AC electric potentials to initiate interstate switching between bistable states. One important reason for such large AC electric switching potentials is that sufficient electric energy must be supplied to each display cell for detaching and moving disclinations from pinning sites.

One embodiment of a nematic liquid crystal display device exhibits configurational bistability between two states. See U.S. Pat. No. 4,333,708 issued to G. D. Boyd et al. on June 8, 1982. The two states, which exist separately in the absence of a holding potential, are topologically inequivalent and derive stability from disclination pinning. Interstate switching is accomplished by detaching and moving disclinations from a pinning site in response to an applied AC switching potential which exceeds a large, sharp switching threshold.

Reduction of the switching threshold level for this type of liquid crystal display device is achieved by prebiasing selected cells in the display with a small AC priming potential prior to applying the larger switching potential. See, for example, copending U.S. patent application, Ser. No. 411,305, filed Aug. 25, 1982. Although the switching level is lower for the latter nematic liquid crystal display device, the switching level remains sufficiently high, for example, on the order of one hundred volts, to ensure detachment and motion of the disclinations necessary to achieve interstate switching.

It should be noted with respect to both of the display devices described above that AC switching potentials are employed to effect interstate switching. The signals which generate these AC switching potentials are generally from the family of constant envelope signals and, more particularly, of substantially constant envelope, gated, AC pulse signals. Constant envelope AC signals are preferred to constant amplitude or DC signals because the latter signals give rise to space charge polarization effects which reduce the amplitude of the applied electric field.

For both of the above display devices, the problems of relatively large AC switching potentials and switching by disclination motion still exist.

SUMMARY OF THE INVENTION

In accordance with the present invention, a small DC electric potential is applied to the nematic liquid crystal display cell to initiate bistable interstate switching between two topologically equivalent horizontal orientational director configurations. The polarity of the DC potential determines the configuration toward which an interstate switching cycle is initiated. After switching commences, a small AC electric potential, for example, less then ten volts, is applied to the cell to complete the switching cycle and to maintain the orientational director configuration in one of the two horizontal states. The bistable nematic liquid crystal display cell comprises upper and lower substrates, nematic liquid crystal material disposed between both substrates and a combination of elements integrally connected to the substrates capable of preferentially orienting directors of the liquid crystal material into an asymmetric horizontal state having an inversion layer substantially adjacent and parallel to a predetermined substrate in the presence of a symmetry breaking DC electric field followed in sequence by a particular applied AC electric potential.

In one embodiment of the invention, the liquid crystal display cell comprises upper and lower parallel substrates having electrically conductive strips and topographically textured tilt alignment surfaces disposed thereon, a nematic liquid crystal material disposed between opposing textured surfaces and a source of variable potential connected to the conductive strips for generating electric switching fields through the liquid crystal material. A cell is divided into an active region and an isolation region which surrounds the active region. In the active region of the cell, the opposing textured tilt alignment surfaces exhibit an equal reverse tilt boundary condition and a twist or angular difference between azimuthal orientations of the opposing textured tilt alignment surfaces for optical differentiation of the states. On each textured tilt alignment surface, the isolation region is characterized by a parallel boundary condition. Interstate switching is performed by applying a first DC potential to the liquid crystal material to initiate alignment of the orientational directors in a first asymmetric horizontal state. A small AC holding potential greater than a critical potential is applied normal to the substrates to complete switching to the first state. Transitions to the second state are accomplished by applying a second DC potential to the liquid crystal material in order to initiate proper alignment of the orientational directors in a second asymmetric horizontal state. Again, the small AC holding potential is applied to complete switching to the second state.

In another embodiment of the invention, the liquid crystal display cell similarly comprises upper and lower parallel substrates having electrically conductive strips and topographically textured tilt alignment surfaces disposed thereon, the nematic liquid crystal material disposed between opposing textured surfaces, and the source of variable potential connected to the conductive strips for generating electric switching fields through the liquid crystal material. This embodiment differs from the embodiment previously described in that topographically textured tilt alignment surfaces on opposing substrates exhibit a reverse tilt boundary condition throughout. Active regions of the latter embodiment are not defined by the texture of the tilt alignment surfaces but, rather, the active regions are defined by the overlap region between conductive strips on opposing substrates.

BRIEF DESCRIPTION OF THE DRAWING

A more complete understanding of the invention may be obtained by reading the following description of a specific illustrative embodiment of the invention in conjunction with the appended drawings in which.

DETAILED DESCRIPTION

A new bistability effect is shown for nematic liquid crystals wherein interstate switching between two topologically equivalent states is initiated by application of a symmetry breaking DC electric potential. A state is maintained in its proper configuration by subsequent application of a small AC holding potential. Each state exhibits a boundary inversion layer containing substantially horizontally aligned orientational directors adjacent to a corresponding boundary. Switching from one state to another requires no disclination motion because of the topological equivalence of the states.

Figure 1:
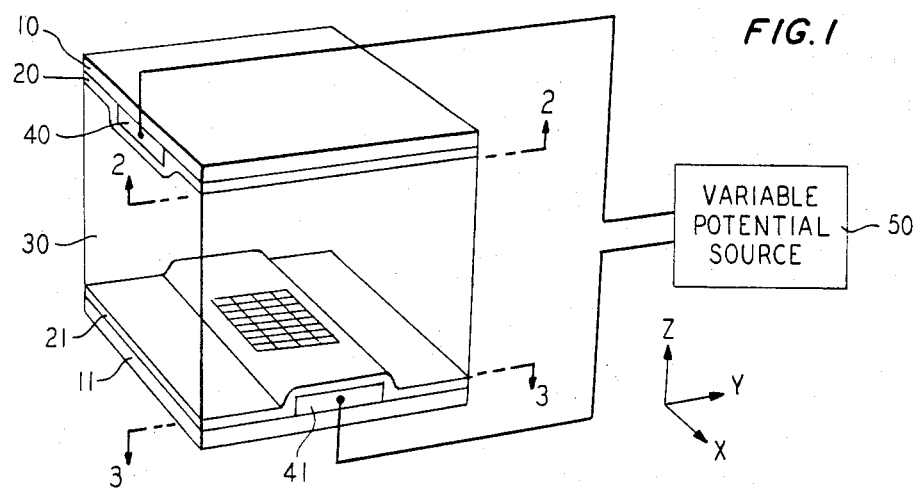
FIG. 1 shows a three-dimensional view of a liquid crystal display cell.

A liquid crystal display cell is shown in FIG. 1. This display cell is one exemplary embodiment of the invention. The cell in FIG. 1 is only one of a plurality of such cells which are included in an entire liquid crystal display. As shown in FIG. 1, the liquid crystal display cell includes upper substrate 10, lower substrate 11, upper topographically textured tilt alignment surface 20, lower topographically textured tilt alignment surface 21, nematic liquid crystal material 30, upper conductor 40, and lower conductor 41. Switching and holding potentials are supplied to the cell from variable potential source 50 connected to upper conductor 40 and lower conductor 41. A set of reference basis vectors (x,y,z) is shown in the Figures to assist in orienting FIG. 1 with respect to FIGS. 4 through 7.

Substrates 10 and 11 support conductors 40 and 41, respectively, as well as provide a means for containing liqid crystal material 30. Each substrate is composed primarily of a transparaent dielectric material such as silicon dioxide or glass or the like.

Conductors 40 and 41 are disposed on an inner opposing surface of each respective substrate in order to permit an AC or DC electric field to be imposed substantially perpendicular to each substrate. Both interdigital electrodes and continuous uniform strip electrodes are arrangements suitable for use as conductors 40 and 41.

As shown in FIG. 1 for illustrative purposes only, conductors 40 and 41 are continuous uniform strip electrodes orthogonally disposed with respect to each other. Conductor 40 is formed on an inner surface of upper substrate 10, while conductor 41 is similarly formed on an inner surface of lower substrate 11 in a direction orthogonal to the direction of conductor 40. Each conductor is deposited or etched by conventional photolithographic techniques as a thin film on the inner surface of the respective substrate. Transparent films such as indium tin oxide are used as conductors on both substrates of transmission mode display cells, whereas opaque films comprised of aluminum, for example, are used for conductors on one substrate in reflection mode display cells.

Topographically textured tilt alignment surfaces 20 and 21 are utilized to induce a known tilt alignment on the liquid crystal molecules adjacent to each surface. These surfaces have also been called tilt alignment surfaces. Surfaces 20 and 21 are transparent non-conducting layers on the exposed inner surfaces of the substrates and conductors for defining surface alignment of the orientational directors of liquid crystal material 30. Surfaces 20 and 21 are integrally connected to each respective substrate by oblique electron beam deposition or thermal evaporation of a material such as titanium oxide or silicon oxide, both of which act as insulators. This results in a uniformly tilted columnar topography for each tilt alignment surface. The topography on each of surfaces 20 and 21 defines a surface tilt angle $\theta_0$ measured from each substrate normal (inner surface) in the range 0 degrees to 90 degrees. Surface tilt angles greater than 45 degrees are preferred in order to ensure dominance of the horizontal orientational director configuration. Tilt alignment surfaces 20 and 21 are more completely described below in reference to FIGS. 2 and 3.

Liquid crystal material 30 is a liquid crystal substance in the nematic mesophase having positive dielectric anisotropy at least in some frequency range. In an exemplary display cell, material 30 is comprised of cyanobiphenyl samples of E7 from Merck Chemical Company. Liquid crystal material 30 is disposed between opposite, parallel substrates wherein the surface to surface separation of the substrates is less than 20 $\mu$m and, typically, is about 10 $\mu$m.

Each display cell is partitioned into an active region and an inactive region. The active region includes a volume of liquid crystal material 30 which is capable of interstate switching in response to appropriately applied electric fields. In general, for the type of cell shown in FIG. 1, the active region is defined as that region between the overlap of conductors 40 and 41. In FIG. 1, a lower boundary of the active region is shown as the crosshatched area on surface 21.

The inactive region surrounding each active region is a volume of liquid crystal material which maintains a fixed orientational director configuration regardless of the configurations in adjacent active regions. Each inactive region, also known as a neutral isolation region, separates, isolates and stabiliizes the surrounded active region of a corresponding cell in the liquid crystal display. A theory of neutral isolation regions is explained by J. Cheng in "Surface Pinning of Disclinations and the Stability of Bistable Nematic Storage Displays," J. Appl. Phys. 52, pp. 724–727 (1981). Also, in this regard, the material contained in U.S. patent application, Ser. No. 252,148, filed Apr. 8, 1981, by J. Cheng (now U.S. Pat. No. 4,400,060, issued Aug. 23, 1983) is expressly incorporated herein.

Additional information concerning physical aspects and construction of the basic display cell shown in FIG. 1 is contained in both U.S. Pat. No. 4,333,708 issued to G. D. Boyd et al. on June 8, 1982 and U.S. patent application, Ser. No. 375,670 filed May 6, 1982 (now U.S.

Pat. No. 4,472,026, issued Sept. 18, 1984). In this regard, pertinent material from each of the above identified references is expressly incorporated herein by reference.

Variable potential source 50 generates several electrical signals which are supplied to upper conductor 40 and lower conductor 41 to impose various AC or DC electric fields through liquid crystal material 30 and substantially normal to substrates 10 and 11. Depending upon the characteristics of the electric field imposed in the active region of the display cell, the orientational director configuration of liquid crystal material 30 is transformed through a distorted horizontal configuration (FIG. 5) into either an upper asymmetric horizontal state (FIG. 6) or a lower asymmetric horizontal state (FIG. 7). After switching to an asymmetric state is initiated, source 50 generates an AC holding signal to complete the switching cycle and to maintain the asymmetric horizontal state in the display cell with a holding potential.

Signals generated by source 50 are generally from the families of constant envelope signals and constant amplitude signals. More particularly, constant envelope signals are substantially constant envelope, gated, AC pulse signals whereas constant amplitude signals are gated DC pulse signals.

In order to carry out switching in accordance with the principles of this invention, signals from source 50 generates potentials referenced to a critical potential $V_c$, which is described in more detail below. The signals are classified into broad categories, namely, a DC write signal, a DC initialization or DC erase signal, and an AC holding signal. A write signal from source 50 imposes a DC potential of magnitude $V_W$ across the display cell to initiate switching of the cell to a first (upper or lower) asymmetric horizontal state, where potential $V_W$ is either above or below critical potential $V_c$ in order to produce desired switching characteristics. An erase signal imposes a potential of magnitude $V_E$ across the display cell to initiate switching of the cell to a second (lower or upper) asymmetric horizontal state, where $V_E$ is substantially equal in magnitude but opposite in polarity to $V_W$. An AC holding signal is generated by source 50 to complete the switching cycle and to maintain orientational directors in the particular asymmetric horizontal state to which they have been switched. The holding signal creates an AC potential of magnitude $V_H$ across the cell, wherein $V_H$ is at least greater than the critical potential $V_c$. Holding potential magnitude $V_H$ can be increased to improve optical contrast between the first and second asymmetric horizontal states. It should be noted that potentials $V_E$, $V_H$, $V_W$ and $V_c$ depends upon the dimensions and other characteristics of the liquid crystal display cell. However, by way of example, it is known that, for a thin cell (10 $\mu$m intersubstrate separation) containing E7, preferred potentials are $V_c = 1.5$ volts, $V_W$ and $V_E$ are between 1.5 volts and 5.0 volts, and $V_H$ is less than 10.0 volts. More detailed information concerning variable potential source 50 and bistable switching of the liquid crystal display cell is given below with respect to FIGS. 5 through 7.

Figure 2:
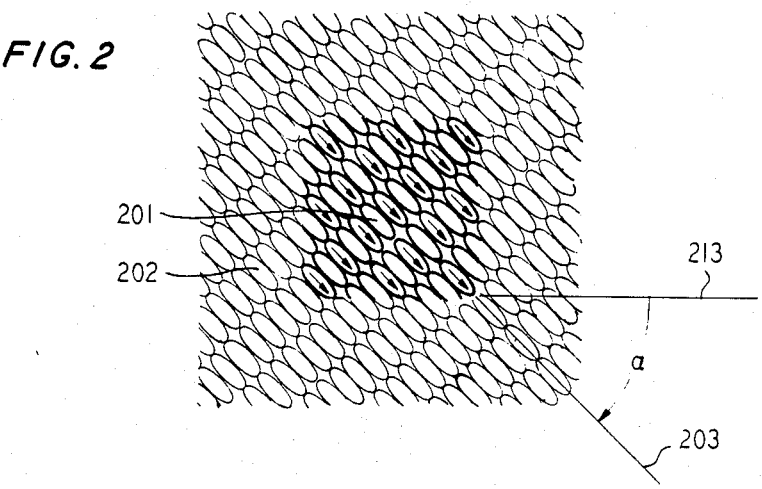
FIG. 2 shows a conceptual rendering of upper topographically textured tilt alignment surface 20 as viewed from line 2—2 in FIG. 1.

FIG. 2 shows a view of upper tilt alignment surface 20 from a position along line 2—2 in FIG. 1. Tilt alignment surface 20 includes active region surface 201 (dark outlined ellipses) and isolation region surface 202 (light outlined ellipses). Ellipses have been drawn to represent tilted molecular columns in the tilted topography of surface 20. Along the major axis of each of several ellipses an active region surface 201, a vector has been drawn as an orthogonal projection of the major axis of each ellipse, i.e., the molecular axis of a column, onto the tilt alignment surface. Since the vector indicates a direction in which the columns are pointed away from the tilt alignment surface, it can be said that the vector indicates a direction of surface tilt for the columns and, hence, a direction of azimuthal bias for the tilt alignment surface.

Azimuthal bias for an active region surface is measured as an angular displacement from a reference line. In the Figures, line 213 is the reference lne. Line 203 is parallel with the vectors on surface 201 to indicate the direction of azimuthal bias for active region surface 201 at angle $\alpha$, where $\alpha$ is an acute angle between $-90$ degrees and $+90$ degrees. It should be noted that isolation region surface 202 is aligned parallel with the direction of azimuthal bias of active region surface 201.

Figure 3:
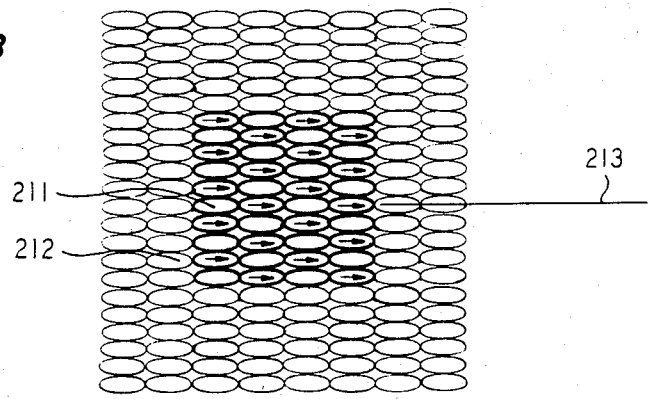
FIG. 3 shows a conceptual rendering of lower topographically textured tilt alignment surface 21 as viewed from line 3—3 in FIG. 1.

FIG. 3 shows a view of lower tilt alignment surface 21 from a position along line 3—3 in FIG. 1. Surface 21 includes active region surface 211 (dark outlined ellipses) and isolation region surface 212 (light outlined ellipses). Reference line 213 also shows the direction of azimuthal bias for active region surface 211 so that the azimuthal bias for surface 211 is zero degrees. The azimuthal bias for surface 212 is parallel with the direction of bias for surface 211.

In the active region of the display cell, surfaces 20 and 21 form a reverse tilt boundary condition. Reverse tilt occurs because the azimuthal bias $\alpha$ of surface 201 is between $-90$ degrees and $+90$ degrees and, when measured as an acute angle from each respective substrate normal (inner surface), the surface tilt angle for surface 201 has an opposite polarity to the surface tilt angle for surface 211. For example, as shown in FIGS. 2 and 3, the surface tilt angle for surface 201 is measured counterclockwise from the inner surface normal of substrate 10 as an acute angle, whereas the tilt angle for surface 211 is measured clockwise from the inner surface normal of substrate 11. As stated above, the surface tilt angles for surfaces 201 and 211 are required to have absolute values in the range 0 degrees to 90 degrees from the respective substrate normals and, more preferably, greater than 45 degrees to favor a horizontal orientational director configuration. Furthermore, it is important to the principles of the invention that the reverse tilt be substantially equal so that the absolute-valued tilt angle of surface 201 is substantially equal to the absolute-valued tilt angle for surface 211.

In the isolation region, surfaces 20 and 21 form a uniformly parallel boundary condition aligned parallel with the azimuthal bias of the corresponding active region surfaces. That is, isolation region surfaces 202 and 212 have columns exhibiting surface tilt angles of approximately 90 degrees from the substrate normal (see FIGS. 2 and 3). It has been found that, for ease in fabrication, the parallel boundary condition of surfaces 201 and 202 be made by oblique evaporation of $SiO_x$ with the plane of incidence in a direction perpendicular to the preferred azimuthal bias direction from an angle of approximately 65 degrees from the substrate normal.

Upper and lower tilt alignment surfaces are important, individually and in combination, to bistable switching of the liquid crystal display cell. Upper and lower tilt alignment surfaces are fabricated in a manner for eliminating a preference of one asymmetric horizontal state over the other in the absence of a particular switching electric field and for providing optical differentiation of the asymmetric states. Particularly, the difference between the azimuthal biases of the upper and lower active region surfaces provides optical differentiation between the bistable states. Symmetry of the surfaces in the display cell eliminates a preference for establishment of an asymmetric horizontal state near a particular surface in the absence of the symmetry breaking field. These features will become more apparent with reference to the description of FIGS. 4 through 7 below.

Figure 4:
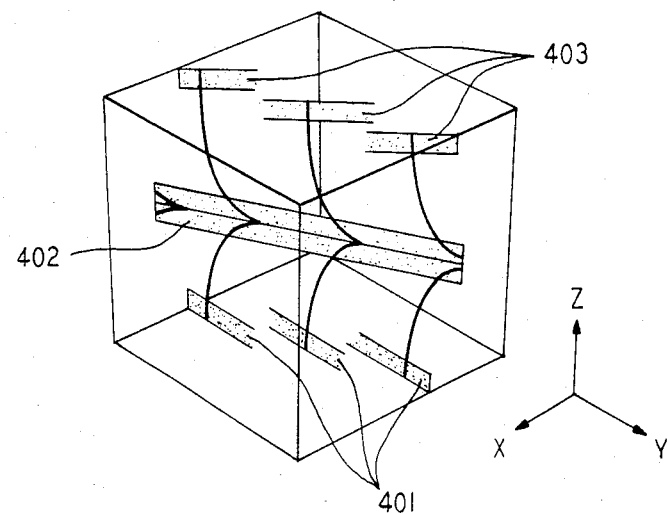
FIGS. 4 through 7 illustrate various horizontal orientational director alignments within the active region in the display cell of FIG. 1 in accordance with the principles of the invention.

FIG. 4 shows a three-dimensional view of the volume of liquid crystal material in the active region of the display cell depicted with the orientational directors in an undistorted horizontal configuration. This is the quiescent configuration of the cell because the orientational directors of the liquid crystal material assume this configuration in the absence of an electric field. Planar section 401 of a boundary layer contain directors of the liquid crystal material oriented substantially at the surface tilt angle of surface 211, while planar sections 403 of a boundary layer contain directors oriented at the surface tilt angle of surface 201. Planar section 402 of an inversion layer contains orientational directors which are substantially horizontal (substantially parallel) with respect to each substrate surface.

For simplicity, FIG. 4 shows only enough detail to see planar section 402 as a single section of coplanar orientational directors in the inversion layer. Clearly, there are a plurality of identical planar sections parallel to planar section 402 which comprise the entire inversion layer. Similarly, there are corresponding pluralities of identical planar sections parallel to each of planar sections 401 and 403 which comprise boundary layers at surfaces 20 and 21, respectively. This simplification of detail has also been applied to FIGS. 5, 6 and 7.

Orientational director alignment is not changed from the undistorted horizontal configuration until a symmetry breaking field is applied to the cell. Furthermore, this change is maintainable provided that a holding potential equal to or greater than the critical potential is subsequently applied to the display cell. Critical potential $V_c$ is defined as the potential above which liquid crystal material 30 behaves in a bistable manner with respect to horizontal configurations. The critical potential is described as follows. Assume that the boundary and inversion layers are completely separated and exhibit uniform splay bend distortion energy $U_o$ per unit volume where $$U_o = \frac{\bar{k}}{2}\left[\frac{\pi}{2\xi}\right]^2, \text{ and}$$

$$\xi = \frac{1}{E}\left[\frac{4\pi \bar{k}}{\Delta \epsilon}\right]^{\frac{1}{2}}$$

where $\xi$ is the electric coherence length defined as the characteristic distance in which liquid crystal molecules with mean splay-bend modulus $\bar{k}$ and dielectric anisotropy $\Delta \epsilon$ rotate from perpendicular to parallel with respect to an applied electric field E. The energy density per unit area of each boundary layer is proportional to the thickness of the particular layer as shown in the table below:

| Layer Type (Reference Numerals) | Thickness | Energy Density Per Unit Area |
|---|---|---|
| Boundary (601, 701) | $\xi/2$ | $U_o\xi/2$ |
| Inversion (not shown) | $2\xi$ | $2 U_o\xi$ |
| Boundary Inversion (602, 702) | $\frac{3}{2}\xi$ | $\frac{3}{2} U_o\xi$ |

Figure 5:
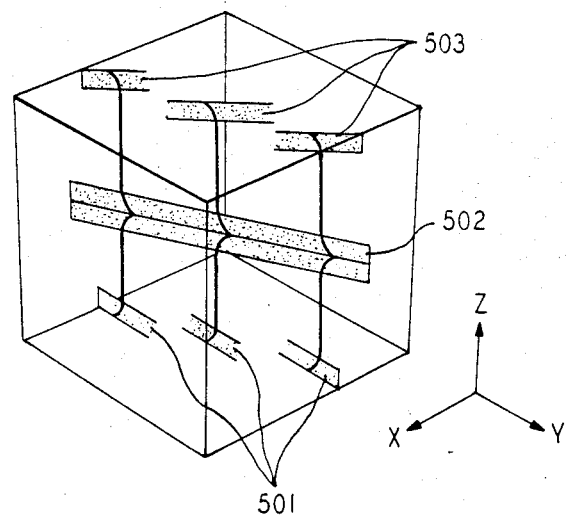
Figure 6:
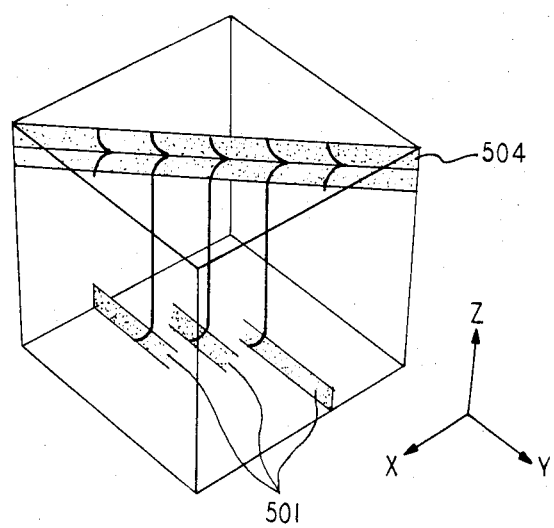
Figure 7:
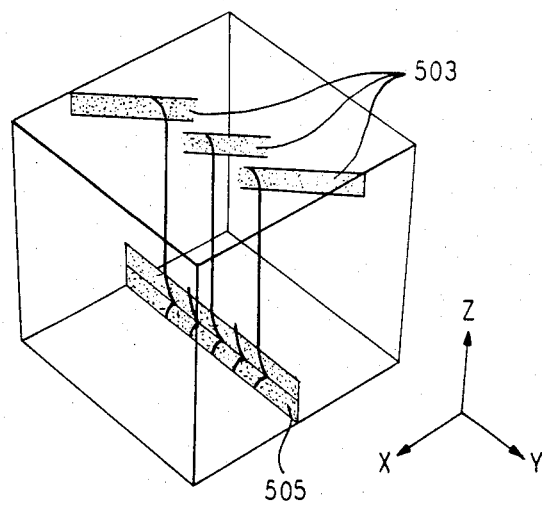

From the table above, it is clear that the distorted horizontal configuration shown in FIG. 5 has a total energy per unit area of $3U_o\xi$, whereas the asymmetric horizontal states of FIGS. 6 and 7 each have total energy per unit area of $2U_o\xi$. However, the argument presented is not valid for an applied field for which the boundary and inversion layers merge across the total thickness, d, of the display cell. Therefore, the cell thickness d is at least equal to $3\xi$ and the critical potential is given by the relation, $$V_c = dE_c = 3\xi E_c.$$

For a sample of cyanobiphenyl E7 and absolute-valued surface tilt angles of approximately 53 degrees, the critical potential $V_c$ is approximately 1.3 to 1.7 volts.

When a potential greater than critical potential $V_c$ is applied to the display cell, the orientational directors of the active region are briefly transformed into a distorted horizontal configuration as shown in FIG. 5. The distorted horizontal configuration contains planar sections 501 of the lower boundary layer, planar section 502 of the inversion layer and planar section 503 of the upper boundary layer, hereinafter referred to, respectively, as lower boundary layer 501, inversion layer 502, and upper boundary layer 503. This state is unstable because the overall elastic and dielectric energy of the orientational director configuration can be lowered when inversion layer 502 merges with either upper boundary layer 503 (FIG. 6) to form the upper asymmetric horizontal state or with lower boundary layer 501 (FIG. 7) to form the lower asymmetric horizontal state. Both resulting asymmetric horizontal states have equal energy, are topologically equivalent, and are separated by an energy barrier represented by the distorted horizontal configuration.

If the DC potential applied to the cell in the distorted horizontal configuration is $V_W$ corresponding to the write signal from source 50, an orientational director transformation is initiated from the distorted horizontal configuration (FIG. 5) toward the upper asymmetric horizontal state shown in FIG. 6. The transformation occurs by direct vertical movement of inversion layer 502 toward boundary layer 503. This results in the formation of boundary inversion layer 504 adjacent to active region surface 201 of surface 20. When AC holding potential $V_H$ is subsequently applied to the cell via the holding signal from source 50, the switching cycle is completed and the orientational directors are maintained in the upper asymmetric horizontal state. Orientational directors in boundary inversion layer 504 reside in the plane which includes both the substrate normal and the azimuthal bias line for active region surface 201, i.e., line 203.

On the other hand, if the DC potential applied to the cell in the distorted horizontal configuration is $V_E$ corresponding to the erase signal from source 50 an orientational director transformation is initiated from the distorted horizontal configuration toward the lower asymmetric horizontal state shown in FIG. 7. The transformation occurs by downward vertical movement of inversion layer 502 toward lower boundary layer 501. When AC holding potential $V_H$ is subsequently applied to the cell via the holding signal from source 50, the switching cycle is completed and the orientational director configuration is maintained in the lower asymmetric horizontal state. Orientational directors in boundary inversion layer 505 reside in a plane which includes both the substrate normal and the azimuthal bias line for active region surface 211, i.e., reference line 213.

Interstate switching between asymmetric horizontal states, for example, upper-to-lower or lower-to-upper, is accomplished by extinquishing the AC holding signal to the cell and allowing liquid crystal material 30 to relax momentarily into the distorted horizontal configuration (FIG. 5) or the undistorted horizontal configuration (FIG. 4). After a short relaxation period, a DC write signal or a DC erase signal is supplied to the cell to initiate the switching appropriately.

It should be noted that the cell will relax into a substantially undistorted horizontal configuration in the presence of any potential less than or even slightly above the critical potential $V_c$. Hence, interstate switching may also be performed by lowering the potential on the cell from the holding potential level to a level slightly above or below the critical potential.

It is advantageous to the operation of the display cell in either asymmetric state for the orientational directors to be inhibited from switching to a vertical configuration. Vertical configuration switching is capable of being prevented by operating variable potential source 50 below the threshold level at which detachment of disclinations occurs. This threshold level is generally found to be on the order of 60 volts.

In a second embodiment of the display cell, the essential elements and methods of operations are as previously described above in relation to the display cell shown in FIGS. 1 through 7. Additionally, isolation regions 202 and 212 exhibit a tilted columnar topography similar to the respective active region which each isolation region surrounds.

Although not shown in the Figures, an appropriate combination of linear polarizers and perhaps a fixed retarder plate can be employed to enhance the optical contrast between the asymmetric states.

One application for this type of nematic liquid crystal display cell is in high speed, matrix addressable, storage display devices. Although addressing speeds are presently found to be on the order of 30 msec, it is clear that certain modifications of the display cell characteristics are capable of improving the performance of the display cell. Particularly, these modifications include reducing the intersubstrate spacing and reducing the viscosity of the nematic liquid crystal material.

What is claimed is:

1. A liquid crystal display cell capable of being switched to either a first state or a second state,
    switching between said first state and said second state being in the absence of movement of a disclination in said display cell,
    the cell comprising first and second substrates disposed in parallel relationship to each other, each substrate having a topographically textured inner surface exhibiting a uniform tilt at an acute surface tilt angle from a respective surface normal, and a nematic liquid crystal material having orientational directors disposed between both substrates, the cell comprising
    means for generating a first polarity DC potential across the liquid crystal material to initiate a first change in orientational director configuration by breaking symmetry of the liquid crystal display cell in order to favor an orientational director configuration wherein an inversion layer of orientational directors is substantially adjacent and parallel to the first substrate, and
    means connected to each substrate for generating an electric potential through the liquid crystal material to complete and maintain the first change in orientational director configuration so that the orientational directors are configured in the first state.

2. The display cell as defined in claim 1 wherein the surface tilt angle for the topographically textured inner surface on the first substrate is substantially equal to, and of opposite polarity to, the surface tilt angle for the topographically textured inner surface on the second substrate so that both topographically textured inner surfaces form an equal reverse tilt boundary condition.

3. The display cell as defined in claim 2 wherein each topographically textured inner surface has an azimuthal bias with respect to a predetermined reference line, the topographically textured inner surface on the first substrate having an azimuthal bias angle in the range from −90 degrees to +90 degrees, exclusively, and the topographically textured inner surface on the second substrate having an azimuthal bias angle of 0 degrees.

4. The display cell as defined in claim 3 wherein the means for initiating the first change includes
    means for generating a second polarity DC potential across the liquid crystal material to initiate a second change in orientational director configuration by breaking symmetry of the liquid crystal display cell to favor the orientational director configuration wherein an inversion layer of orientational directors is substantially adjacent and parallel to the second substrate, and
    wherein the means for generating an electric potential further includes means connected to each substrate for generating an electric potential through the liquid crystal material to complete and maintain the second change in orientational director configuration so that the orientational directors are configured in the second state.

* * * * *

UNITED STATES PATENT AND TRADEMARK OFFICE
CERTIFICATE OF CORRECTION

PATENT NO. : 4,601,542

DATED : July 22, 1986

INVENTOR(S) : Robert B. Meyer

It is certified that error appears in the above-identified patent and that said Letters Patent is hereby corrected as shown below:

Column 8, line 6, "601, 701" should read --501, 503--; line 7, "not shown" should read --502--; line 10, "602, 702" should read --504, 505--.

Signed and Sealed this

Third Day of February, 1987

*Attest:*

DONALD J. QUIGG

*Attesting Officer*      *Commissioner of Patents and Trademarks*